US00RE40600E

(19) United States
(12) Reissued Patent
Maltby et al.

(10) Patent Number: US RE40,600 E
(45) Date of Reissued Patent: Dec. 9, 2008

(54) RECEPTACLE-MOUNTED COVER PLATE

(75) Inventors: Edgar W. Maltby, Mesa, AZ (US); Michael Shotey, Las Vegas, NV (US)

(73) Assignee: TayMac Corporation, Gilbert, AZ (US)

(21) Appl. No.: 10/318,629

(22) Filed: Dec. 12, 2002

Related U.S. Patent Documents

Reissue of:
(64) Patent No.: 6,160,219
Issued: Dec. 12, 2000
Appl. No.: 08/902,849
Filed: Jul. 30, 1997

U.S. Applications:
(63) Continuation-in-part of application No. 08/775,382, filed on Dec. 30, 1996, now Pat. No. 5,965,846, which is a continuation of application No. 08/310,284, filed on Sep. 21, 1994, now abandoned.

(51) Int. Cl.
*H02G 3/14* (2006.01)

(52) U.S. Cl. ..... 174/66; 174/67; 220/241; D8/353

(58) Field of Classification Search ..... 179/66, 179/67; 220/241, 242; D8/350, 351, 352, D8/353
See application file for complete search history.

(56) References Cited

U.S. PATENT DOCUMENTS

| | | | | | |
|---|---|---|---|---|---|
| 943,958 | A | | 12/1909 | Wheeler | |
| 946,646 | A | | 1/1910 | Pratt | |
| 1,926,001 | A | | 9/1933 | Goodridge | |
| 2,321,640 | A | | 6/1943 | Adkins | |
| D159,413 | S | * | 7/1950 | Hayman | D8/353 |
| 2,596,236 | A | | 5/1952 | Glosier | |
| 3,386,071 | A | * | 5/1968 | Allen | D8/350 X |
| 3,432,611 | A | | 3/1969 | Gaines et al. | |
| 3,437,737 | A | | 4/1969 | Wagner | |
| 3,437,738 | A | | 4/1969 | Wagner | |
| 3,438,534 | A | | 4/1969 | Zerwes | |
| 3,488,428 | A | * | 1/1970 | Smith | 174/51 |
| 3,518,356 | A | | 6/1970 | Friedman | |
| 3,530,230 | A | | 9/1970 | Cormier et al. | |
| 3,544,703 | A | | 12/1970 | Jones | |
| 3,840,692 | A | | 10/1974 | Wells | |
| 3,928,716 | A | | 12/1975 | Marrero | |
| 3,965,287 | A | | 6/1976 | Mueller | |

(Continued)

FOREIGN PATENT DOCUMENTS

| | | | | |
|---|---|---|---|---|
| GB | 321184 | * | 11/1929 | 174/66 X |
| GB | 1082008 | * | 9/1967 | 220/3.8 X |

*Primary Examiner*—Dhiru R Patel
(74) *Attorney, Agent, or Firm*—Booth Udall, PLC

(57) ABSTRACT

A cover plate for covering an electrical outlet. The electrical outlet includes a receptacle having at least one socket and at least one securing aperture for receiving a securing device, wherein each of the at least one socket includes a face and a plurality of blade apertures for receiving plug blades. The cover plate includes a front surface for facing outwardly from the electrical outlet and externally relative to the cover plate and a back surface facing toward the electrical outlet. A plurality of blade apertures extend through the cover plate through the front and back surfaces. Optionally, at least one securing aperture extends through the cover plate. The front surface of the cover plate contains, or includes, a single line extending substantially in a rectangle around the blade apertures and the at least one securing aperture, the front surface otherwise being continuous, having uniform topography, and being free of any other apertures. The cover plate is a single component and is solid except for the blade apertures and the at least one securing aperture. In accordance with another aspect, the front surface of the cover plate contains, or includes, a first substantially rectangular region, and a second region. The first region may be elevated or recessed with respect to the second region.

81 Claims, 3 Drawing Sheets

U.S. PATENT DOCUMENTS

| | | | | | |
|---|---|---|---|---|---|
| 4,032,030 | A | | 6/1977 | Bass et al. | |
| 4,500,746 | A | | 2/1985 | Meehan | |
| 4,631,354 | A | | 12/1986 | Boteler | |
| 4,737,599 | A | | 4/1988 | Fontaine | |
| 4,774,641 | A | * | 9/1988 | Rice | 362/95 |
| 4,833,277 | A | | 5/1989 | Jacoby, Jr. et al. | |
| 4,886,465 | A | * | 12/1989 | Warner | D8/350 X |
| 4,970,349 | A | | 11/1990 | Jones | |
| 4,972,045 | A | | 11/1990 | Primeau | |
| 5,017,153 | A | | 5/1991 | Bowman | |
| 5,180,886 | A | | 1/1993 | Dierenbach et al. | |
| 5,342,995 | A | | 8/1994 | Comerci et al. | |
| 5,362,924 | A | | 11/1994 | Correnti | |
| 5,518,132 | A | * | 5/1996 | Chen | 220/241 |
| 5,763,831 | A | | 6/1998 | Shotey et al. | |
| 5,835,980 | A | | 11/1998 | Houssian | |
| 5,965,846 | A | | 10/1999 | Shotey et al. | |
| 6,160,219 | A | | 12/2000 | Maltby et al. | |
| 6,420,653 | B1 | | 7/2002 | Shotey et al. | |
| 6,511,343 | B1 | | 1/2003 | Shotey et al. | |

* cited by examiner

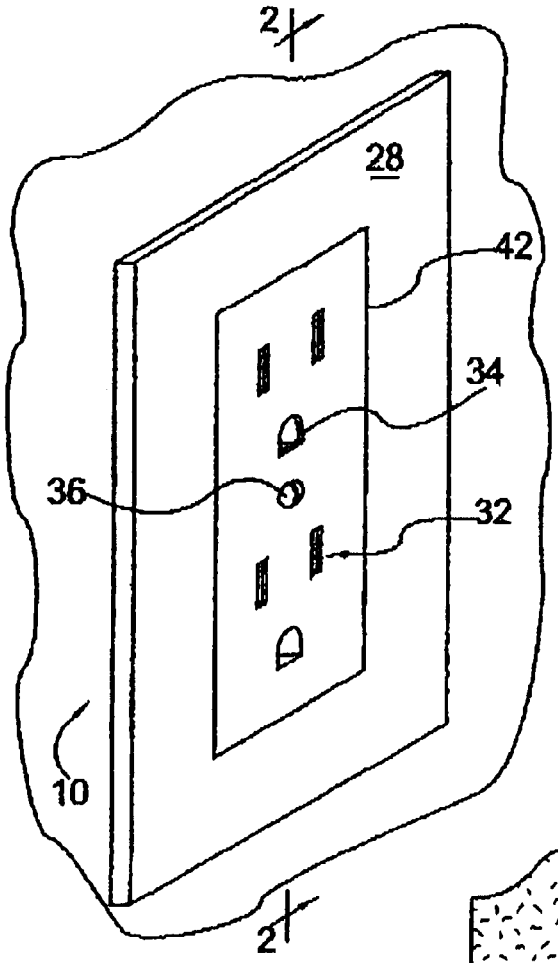
FIG. 1
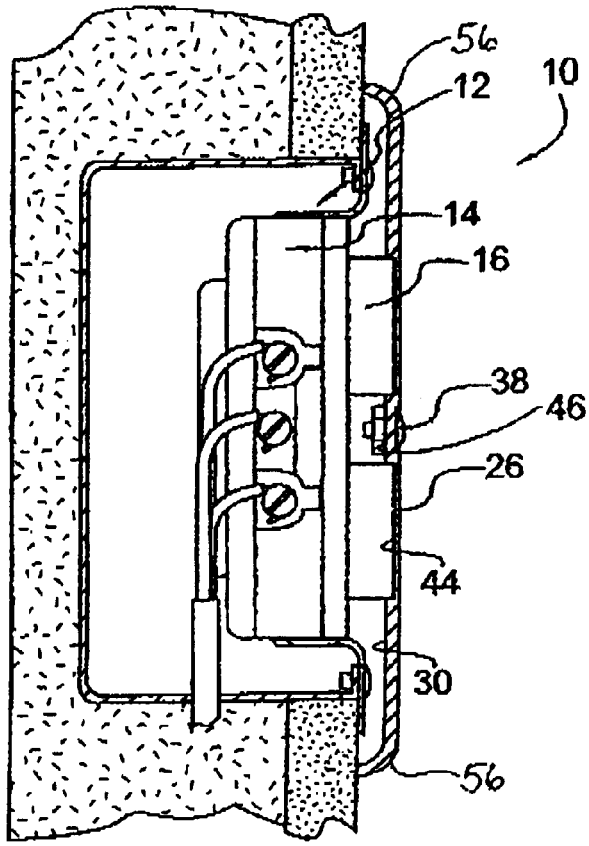
(AMENDED) FIG. 2

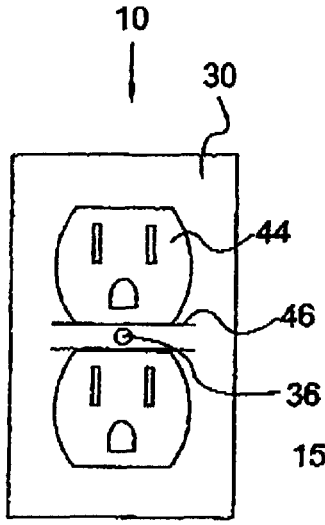
FIG. 4
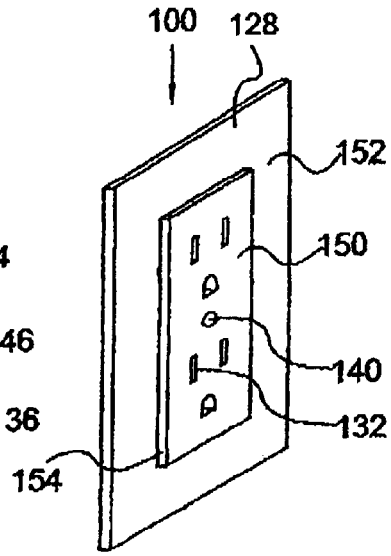
FIG. 5
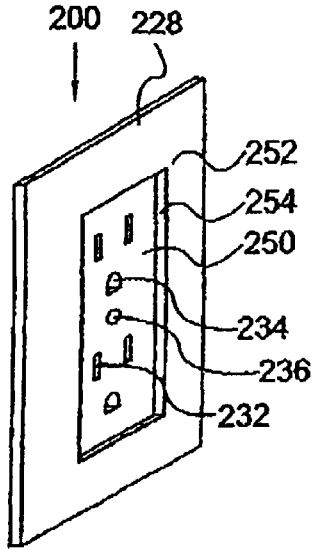
FIG. 6
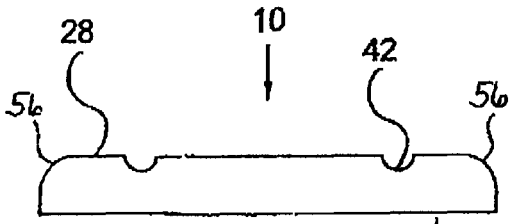
(AMENDED) FIG. 7
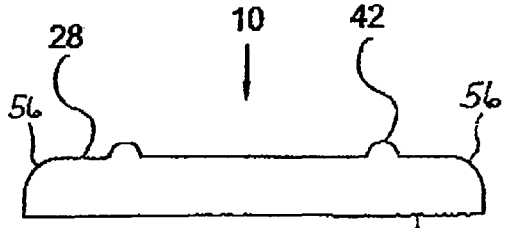
(AMENDED) FIG. 8
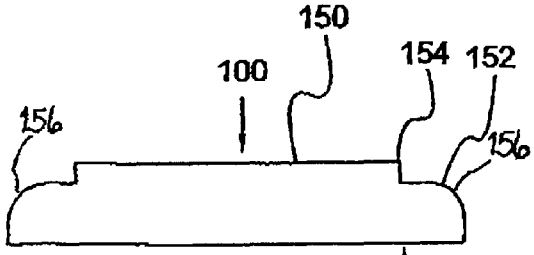
(AMENDED) FIG. 9
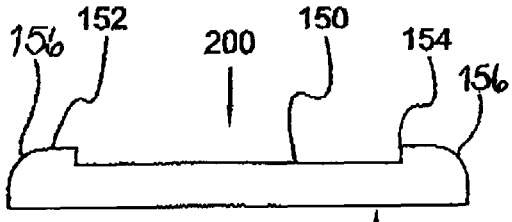
(AMENDED) FIG. 10

RECEPTACLE-MOUNTED COVER PLATE

Matter enclosed in heavy brackets [ ] appears in the original patent but forms no part of this reissue specification; matter printed in italics indicates the additions made by reissue.

This is a continuation-in-part of U.S. patent application Ser. No. 08/775,382, filed Dec. 30, 1996, now U.S. Pat. No. 5,965,846, which was a continuation of U.S. application Ser. No. 08/310,284, now abandoned.

BACKGROUND OF THE INVENTION

1. Field of the Invention

The present invention relates generally to cover plates for electrical outlets, for example, such as those used in residential and commercial buildings. More specifically, it relates to cover plates for electrical outlets wherein the electrical outlet includes one or more sockets.

2. Description of the Related Art

Commercially-known and available electrical outlets for building applications, such as residential and commercial building outlets, typically include a wall box, a receptacle and a cover plate. The receptacle typically comprises a yoke with a pair of sockets incorporated into the yoke. The wall box usually is attached to a framing member, such as a wall stud, prior to placement of the interior wall surface. The receptacle is fixed within and attached to the wall box, typically by screws. When the interior wall surface, such as drywall or sheet rock panels, are placed on the framing members, access to the receptacle is provided by a hole cut in the interior wall surface material. The cover plate is placed over this hole and attached to the receptacle, usually by one or more screws. Electrical devices are plugged into the sockets by inserting plug blades through aligned apertures in the cover plate and socket.

Many commercially-known cover plate designs have included relatively large apertures into which fit the faces of the sockets. Examples of such cover plates are provided in U.S. Pat. No. 4,163,137, issued to Close, Jr. (FIGS. 4 and 6).

In recent years an electrical outlet design known as the "decorator" design has gained popularity. An example of the decorator design is shown in U.S. Pat. No. 5,180,886, issued to Dierenbach et al., and U.S. Pat. No. 5,073,681, issued to Hubben et al. The decorator design involves a receptacle which includes, for example, two sockets configured in a rectangular receptacle face. The decorator design also includes a cover plate in which a rectangular cutout is provided in the center of the plate to mate with and receive the rectangular receptacle face. Decorator designs have enjoyed substantial popularity based in no small part upon their modern and pleasing appearance.

The decorator designs have been limited, for example, in that they generally cannot be used with the commercially-known and widely-used yoke and dual socket receptacles mentioned above. The decorator designs also have been disadvantageous in that they are relatively expensive. Decorator design cover plates also are relatively more difficult than many other outlet designs to clean and maintain, in large part because of their two-component design. Debris can be caught in the gap between the receptacle face and the cover plate. Properly mating and accurately aligning the receptacle face with the cover plate also can be problematic.

Cover plates not infrequently are installed after construction of the building or wall is completed. It is common practice to remove the cover plate during remodeling or redecorating so that it does not become damaged or defaced with paint drops and splatters, wallpaper paste, or other decorating materials. Commercially-known cover plates are easily removed by unscrewing the screw or screws that attach them directly to the receptacle. However, the receptacle is not usually removed during remodeling or redecorating because it is hard-wired into the electrical system of the building. Consequently, the receptacle and sockets are left exposed and the faces of the sockets can be stained with splattered paint and the like. If not cleaned immediately, the receptacle face may become permanently defaced, thereby making the electrical outlet more unsightly and conspicuous. Repeated paintings only make the problem worse. Reinstalling the cover plate then emphasizes the paint-stained surface of the outlet, as the defaced socket surface is compared to the pristine surface of the cover plate.

Accordingly, commercially-known cover plates, including decorator designs, have been relatively limited in their susceptibility to these drawbacks.

OBJECTS OF THE INVENTION

Accordingly, an object of the present invention is to provide an electrical outlet cover plate which is capable of covering commercially-known receptacles and electrical outlets.

Another object of the present invention is to provide an electrical outlet cover plate which is of relatively simple design and low cost.

Another object of the invention is to provide an electrical outlet cover plate which is relatively easy to assemble, align, clean and maintain.

Additional objects and advantages of the invention will be set forth in the description which follows, and in part will be apparent from the description, or may be learned by practice of the invention. The objects and advantages of the invention may be realized and obtained by means of the instrumentalities and combinations pointed out in the appended claims.

SUMMARY OF THE INVENTION

To achieve the foregoing objects, and in accordance with the purposes of the invention as embodied and broadly described in this document, a cover plate is provided for covering an electrical outlet, wherein the electrical outlet includes a receptacle having at least one socket and at least one securing aperture for receiving a securing device. Each of the at least one socket includes a face and a plurality of blade apertures for receiving plug blades.

The cover plate according to one aspect of the invention comprises a front surface for facing outwardly from the electrical outlet and externally relative to the cover plate and a back surface facing toward the electrical outlet. The cover plate also includes a plurality of blade apertures extending through the cover plate through the front and back surfaces and positioned in the cover plate so the blade apertures are in substantial alignment with the at least two blade apertures of the at least one socket when the cover plate is affixed to the electrical outlet for receiving the plug blades. In some but not necessarily all embodiments, at least one securing aperture extends through the cover plate through the front and back surfaces and is positioned in the cover plate so the at least one securing aperture is in substantial alignment with a corresponding one of the at least one securing aperture of the receptacle when the cover plate is affixed to the electrical outlet for receiving the securing device and fixedly positioning the cover plate with respect to the receptacle. The front surface of the cover plate contains, and may comprise, a single line extending substantially in a rectangle around the blade apertures and the at least one securing aperture. The front surface otherwise preferably is continuous, having uniform topography, and being free of any other apertures. The cover plate according to this aspect of the invention is a single component and is solid except for the blade apertures and the at least one securing aperture.

The line of the front surface may comprise an indented line indented relative to the remainder of the front surface, or a raised line raised relative to the remainder of the front surface. The front surface may be substantially planar, and a substantial portion of the front surface may be substantially planar. The front surface preferably covers the entire face of the at least one socket except for the blade apertures of the at least one socket when the cover plate is affixed to the electrical outlet. The receptacle generally will include a face portion corresponding to the face of the at least one socket. In such instances, the front surface of the cover plate may be sized to cover the entire face portion of the receptacle except for the blade apertures of the at least one socket and the at least one securing aperture of the receptacle when the cover plate is affixed to the electrical outlet.

In one embodiment of this cover plate, the front surface other than the indented line is substantially smooth. Other examples of uniform texture, however, also are available, of course.

Often the electrical outlet is disposed in a hole or cavity in the wall, such as in a wall box. In such instances, the front surface preferably would be sized to cover the entire hole except for the blade apertures of the at least one socket and the at least one securing aperture of the receptacle when the cover plate is affixed to the electrical outlet.

The back surface may include at least one thinned receiving area sized to receive the at least one socket of the receptacle such that the at least one receiving area receives and mates to the at least one socket when the cover plate is affixed to the electrical outlet.

In accordance with another aspect of the invention, a cover plate is provided for covering an electrical outlet, wherein the cover plate comprises a front surface for facing outwardly from the electrical outlet and externally relative to the cover plate and a back surface facing toward the electrical outlet; a plurality of blade apertures extending through the cover plate through the front and back surfaces and positioned in the cover plate so the blade apertures are in substantial alignment with the at least two blade apertures of the at least one socket when the cover plate is affixed to the electrical outlet for receiving the plug blades. As an optional feature, at least one securing aperture extends through the cover plate through the front and back surfaces and is positioned in the cover plate so the at least one securing aperture is in substantial alignment when a corresponding one of the at least one securing aperture of the receptacle when the cover plate is affixed to the electrical outlet for receiving the securing device and fixedly positioning the cover plate with respect to the receptacle. The front surface of the cover plate may contain according to one aspect of the invention, and it may comprise according to another, a first region substantially rectangular in shape disposed about and including the blade apertures and the at least one securing aperture, and a second region which contains or, in the latter aspect of the invention, comprises the portion of the front surface other than the first region. The front surface has a discontinuity between the first and second regions.

The first region may be elevated outwardly from the front surface relative to the second region. The first region also may be recessed inwardly from the front surface relative to the second region. Preferably each of the first and second regions of the front surface is substantially planar. The first and second regions preferably lie in a common plane, but they need not. In some embodiments, a substantial portion of the second region may substantially planar.

The back surface may include at least one thinned receiving area sized to receive the at least one socket of the receptacle such that the at least one receiving area receives and mates to the at least one socket when the cover plate is affixed to the electrical outlet. A portion of the back surface preferably is shaped to directly contact and be substantially flush with the face of the at least one socket.

Cover plates according to the invention can provide essentially the same appearance as decorator cover plate designs. In view of its unitary construction, however, this decorator look is achieved without the limitations of the actual decorator design as noted above. The cost on a unit basis can be significantly less than known decorator designs, not only for manufacture of the unit but also for application in replacement, remodeling, and the like. The unitary construction eliminates the previously-noted problems and limitations of receptacle face and cover plate alignment. The design, for example, is easy to install and eliminates socket and cover plate alignment concerns. It requires fewer components, thereby often reducing costs. It also can eliminate color discrepancies between socket faces and the cover plate which has been a difficulty with prior cover plates.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention. Of the drawings:

FIG. 1 shows a perspective view of a cover plate according to a first preferred embodiment of the invention;

FIG. 2 shows a cross sectional side view of the cover plate of FIG. 1 taken along line 2—2 of FIG. 1, wherein the cover plate is attached to an electrical outlet;

FIG. 4 shows a rear view of the cover plate of FIGS. 1 and 2;

FIG. 5 shows a perspective view of a second preferred embodiment of the invention;

FIG. 6 shows a perspective view of a third preferred embodiment of the invention;

FIG. 7 shows an end cutaway view of the cover plate of FIGS. 1 and 2;

FIG. 8 shows an end cutaway view of a cover plate similar to that of FIGS. 1 and 2, but in which the line is raised, rather than indented;

FIG. 9 shows an end cutaway view of the cover plate shown in FIG. 5; and FIG. 10 shows an end cutaway view of the cover plate shown in FIG. 6.

DETAILED DESCRIPTION OF THE PREFERRED EMBODIMENT

Figure 3:
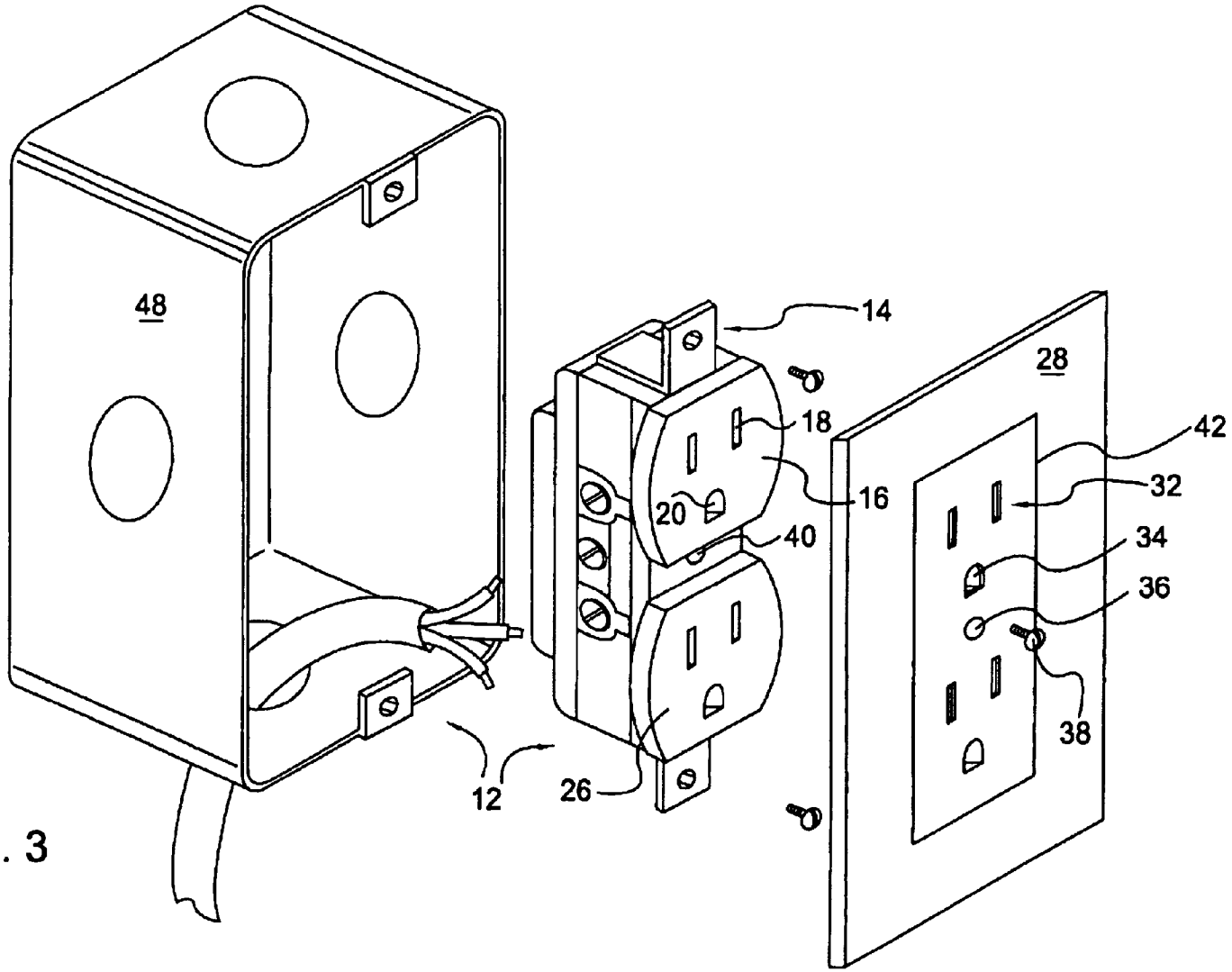
FIG. 3 shows an exploded view of the cover plate and electrical outlet shown in FIG. 2.

Reference will now be made in detail to the presently preferred embodiment of the invention as illustrated in the accompanying drawings, in which like reference characters designate like or corresponding parts throughout the drawings and the various embodiments.

In accordance with the invention, a cover plate is provided for covering an electrical outlet. Typical electrical outlets for which cover plates according to the invention are well suited would include a receptacle having at least one socket and, optionally, at least one securing aperture for receiving a securing device. Each of the at least one socket includes a face and a plurality of blade apertures for receiving plug blades. The portion of the receptacle corresponding to the socket face is referred to in this document as the socket face.

A cover plate 10 according to a presently preferred embodiment of the invention is shown in FIG. 1. Cover plate 10 is adapted to be attached to and cover an electrical outlet 12, shown in FIGS. 2 and 3, which includes a receptacle 14 having two sockets 16. Each socket 16 includes a pair of plug blade apertures 18 and a third blade aperture 20 in the form of a ground plug aperture for receiving plug blades. Receptacle 14 also includes a threaded securing aperture 40 for receiving a securing device, in this case a mounting screw 38. Each socket 16 includes a face 26. Similarly, receptacle 14 has a face portion which corresponds to socket faces 26.

The cover plate according to one aspect of the invention comprises a front surface for facing outwardly from the electrical outlet and externally relative to the cover plate and a back surface for facing toward the electrical outlet. With reference to the preferred embodiment of FIG. 1, cover plate 10 comprises a front side 28 for facing outwardly from electrical outlet and externally relative to cover plate 10, and a back surface 30 (FIG. 4) for facing toward electrical outlet 12.

The cover plate according to this aspect of the invention also includes at least two blade apertures extending through the surface and aligned with the at least two blade apertures of the at least one socket for receiving the plug blades. Referring to FIG. 1, cover plate 10 includes two pairs of blade apertures 32 extendng through cover plate 10 through front surface 28 and back surface 30 and positioned in the cover plate so blade apertures 32 are in substantial alignment with blade apertures 18 of sockets 16 for receiving plug blades (not shown). Cover plate 10 includes an additional blade aperture in the form of a ground plug aperture 34 associated with each pair of the aforementioned blade apertures 32 to receive a ground blade or shaft of the plug (not shown), e.g., from an appliance.

The number of apertures in cover plate 10 for receiving plug blades is dependent on the number of blades on the plug and the number of plugs which cover plate 10 and receptacle 14 can support simultaneously. Typically, the number and position of apertures on the cover plate will match the number and position of apertures on the receptacles, although fewer apertures may be used on the cover plate to occlude apertures in the sockets, if desired. Conventional dual receptacle outlets have two sets of apertures, one set for each socket. In addition to outlets having different number of apertures, outlets may have varying numbers of sockets. For example, convention outlets have two sockets and are known as one-gang outlets, as shown in FIGS. 1–3. Two-gang outlets also are common. Cover plates according to the present invention can be made with corresponding numbers and placement of apertures to match and align with the number of underlying sockets.

The cover plate according to the invention may but need not include at least one securing aperture extending through the cover plate, through the front and back surfaces and positioned in the cover plate the at least one securing aperture is in substantial alignment with a corresponding one of the at least one securing aperture of the receptacle when the cover plate is affixed to the electrical outlet for receiving the securing device and fixedly positioning the cover plate with respect to the receptacle. In this regard, cover plate 10 includes a securing aperture 36 approximately the same size as a mounting screw 38 extending through the cover plate approximately at its center and aligned with a securing aperture 40 of receptacle 12. Securing aperture 36 of cover plate 10 is adapted to receive mounting screw 38 to fixedly position cover plate 10 with respect to receptacle 12.

In accordance with this aspect of the invention, the front side of the cover plate contains a single line extending substantially in a rectangle or rectangular shape around the blade apertures and the at least one securing aperture, but the front surface otherwise is continuous, it has uniform topography, and it is free of any other apertures.

With reference to cover plate 10 of FIG. 1, front side 28 contains a single indented line 42 extending substantially in a rectangle around blade apertures 32 and securing aperture 36. Indented line 42 is positioned essentially in accordance with the gap in commercially-known decorator designs between the receptacle and the cover plate. In this instance, however, indented lines 42 is not a gap between physically separate and distinct components. Instead is it merely an indentation, for example, approximately 30 thousandths of an inch (0.030 inches) drop into front surface, which creates the appearance of mated but separate components, but which in fact comprises part of a single, unified cover plate. Indented line 42 has a width across the surface essentially about the same as the width of the gap in decorator designs between the receptacle and the cover plate, e.g., of about 30 thousandths (0.030 inches) across the front surface 28. The rectangle formed by indented rectangular line 42 preferably is centered about plug blade apertures 32 and ground plug apertures 34 from top to bottom and from side to side. As an illustrative example, for cover plate 10, which is 2.75 inches wide and 4.5 inches from top to bottom, the rectangle formed by indented rectangular line 42 might be from about 1.125 inches to about 1.5 inches, and preferably about 1.3 inches in the width dimension as shown in the drawings. The rectangle formed by indented rectangular line might be from about 2.5 inches to 2.7 inches from top to bottom, and preferably about 2.6 inches. Other than idented line 42, front surface 28 is continuous, it has a substantially smooth, uniform topography, and it is free of any other apertures.

The rectangular line may take alternate forms besides an indented line. It may, for example, constitute or comprise a raised line raised relative to the remainder of the front surface 28. An example of such a raised line is shown in the cross section depicted in FIG. 8.

Front surface 28 other than the indented line 42 preferably has a uniform topography. It may be smooth or substantially so, it may have a substantially uniform roughened texture, etc.

According to the invention, the cover plate is a single component and is solid except for the blade apertures and the at least one securing aperture. This feature is apparent in the cover plate 10 according to the preferred embodiment.

In the preferred embodiment, a portion of the back surface is shaped to directly contact and be substantially flush with the face of the at least one socket. This is best illustrated in FIG. 2, which shows back surface 30 of cover plate 10 in direct contact with and flush with the faces of sockets 16.

In the cover plate according to the invention, the back surface optionally may include at least one thinned receiving area sized to receive the at least one socket of the receptacle such that the receiving area receives and mates to the at least one socket when the cover plate is affixed to the electrical socket. Cover plate 10 implements this feature by including a pair of thinned receiving areas 44, each shaped and sized to receive and mate with one of socket faces of socket 16 of receptacle 14 so that each receiving area 44 receives and mates to one of sockets. A slightly elevated wall 46 extends between mounting screw aperture 36 and each of socket receiving areas 44 to prevent rotation or misalignment of cover plate 10 relative to receptacle 14. These features enable cover plate 10 to be securely mounted to receptacle 14, and they greatly facilitate alignment of the cover plate relative to the electrical outlet.

While the shape of the thinned receiving areas need not coincide with the shape of the socket, the thinned areas can be manufactured to precisely match the shape of the socket. The cover plate is stronger and more durable with smaller thinned areas, however. With the more durable embodiment of the cover plate, the cover plate can also protect the receptacle from damage due to rough handling. For example, if a plug inserted into an outlet with a conventional cover plate is yanked out of the wall sideways, that is, substantially parallel to the wall, the forces applied to the sockets can cause the receptacle to be jarred loose or to crack. A cover plate according to the present invention can help protect the receptacle because as the plug is pulled sideways from an outlet having such a cover plate, the applied forces act on the cover plate, reducing or eliminating the lateral forces on the receptacle.

Preferably, the front surface of the cover plate covers the entire face of the at least one socket except for the blade apertures of the at least one socket when the cover plate is affixed to the electrical outlet. The receptacle typically includes a face portion corresponding to the face of the at least one socket. The front surface of the cover plate is sized to preferably cover the entire face portion of the receptacle except for the blade apertures of the at least one socket, and the at least one securing aperture of the receptacle if one is present.

The electrical outlet typically is disposed in a hole provided in the interior wall surface material, such as the drywall. Referring to FIG. 3, it shows an exploded view of cover plate 10 installed over an existing receptacle 14. Cover plate 10 covers the entire outlet, including the wall box 48, and conforms to the interior wall surface of the building essentially as would commercially-known cover plates *by the front side sloping toward the interior wall surface. An example of this is shown in FIGS. 2, 7 and 8 as reference number 56 and in FIGS. 9 and 10 as reference number 156.* Front surface 28 covers the entire hole except for the blade apertures of the at least one socket and the at least one securing aperture of the receptacle.

It has been noted above that the inclusion of a securing aperture in the cover plate surface is optional. A securing device which requires an associated aperture is not necessarily a requirement. Correspondingly, alternative means may be used for securing cover plate 10 over and to receptacle 14 and electrical outlet 12. For example, a pin may be inserted through the at least one securing aperture into an alignment, mated receiving aperture or apertures in the receptacle or yoke. If securing apertures are not desired, the cover plate may be adhesively attached over the receptacle or yoke, for example, using double-sided tape or hook and loop fasteners. The cover plate also may be snapped onto the receptacle by fitting the sockets snugly into the depressed, thinned receiving areas which have been manufactured to precisely match the shape of the sockets. Bracketing arrangements may be used, as may like methods and approaches. In all the instances, the cover plate preferably would exclude the at least one securing aperture noted above.

Cover plates according to the present invention typically would have outside dimensions that substantially match a conventional or existing cover plate. The preferred cover plates described herein, however, may be designed in virtually any desired size and shape, for example, to enhance the appearance, maintainability, etc. of underlying sockets and the electrical outlet hole.

In accordance with another aspect of the invention, a cover plate is provided which includes a front surface for facing outwardly from the electrical outlet and externally relative to the cover plate and a back surface facing toward the electrical outlet. The cover plate according to this aspect of the invention also includes a plurality of blade apertures extending through the cover plate through the front and back surfaces and positioned in the cover plate so the blade apertures are in substantial alignment with the at least two blade apertures of the at least one socket when the cover plate is affixed to the electrical outlet for receiving the plug blades.

The cover plate according to this aspect of the invention further includes at least one securing aperture extending through the cover plate through the front and back surfaces and positioned in the cover plate so the at least one securing aperture is in substantial alignment with a corresponding one of the at least one securing aperture of the receptacle when the cover plate is affixed to the electrical outlet for receiving the securing device and fixedly positioning the cover plate with respect to the receptacle.

In the cover plate according to this aspect of the invention, the front surface of the cover plate contains, or in some embodiments comprises, a first region substantially rectangular in shape disposed about and including the blade apertures and the at least one securing aperture, and a second region which contains, or in some embodiments comprises, the portion of the front surface other than the first region. The front surface has a discontinuity between the first and second regions, but is otherwise continuous, having uniform topography and being free of any other apertures. The second region is otherwise continuous, having uniform topography and being free of any apertures.

A cover plate 100 according to a second preferred embodiment of the invention is shown in FIG. 5. Cover plate 100 includes a front surface 128 for facing outwardly from an electrical outlet 112 and externally relative to the cover plate, and a back surface (FIG. 4) facing toward the electrical outlet.

Cover plate 100 includes a plurality of blade apertures 132 extending through the cover plate through the front and back surfaces and positioned in the cover plate so blade apertures 132 are in substantial alignment with the blade apertures of the at least one socket when cover plate 100 is affixed to the electrical outlet for receiving the plug blades.

Cover plate 100 also includes at least one securing aperture 140 extending through the cover plate through the front and back surfaces and positioned in cover plate 100 so the at least one securing aperture is in substantial alignment with a corresponding one of the at least one securing aperture of the receptacle when the cover plate is affixed to the electrical outlet for receiving a securing device such as a mounting screw and fixedly positioning the cover plate with respect to the receptacle.

Front surface of cover plate 100 contains a first region 150 substantially rectangular in shape disposed about and including blade apertures 132 and a mounting screw aperture 140, and a second region 152 which contains the portion of front surface 128 other than first region 150. Front surface 128 has a discontinuity 154 between the first and second regions, but is otherwise continuous, having uniform topography and being free of any other apertures. Second region 152 is otherwise continuous, having uniform topography and being free of any apertures.

First region 150 of cover plate 100 is elevated outwardly from front surface 128 relative to second region 152.

A cover plate 200 according to a third preferred embodiment is shown in FIG. 6. Cover plate 200 is similar to cover plate 100, but first region 250 is recessed inwardly from front surface 228 relative to second region 252.

In both cover plates 100 and 200, each of the first and second regions of the front surface is substantially planar. Moreover, in these embodiments, a substantial portion of the second region is substantially planar.

The back surface of cover plate 100 and 200 may be the same as that disclosed for cover plate 10. Thus, a portion of the back surface may be shaped to directly contact and be substantially flush with the face of the at least one socket. The back surface of each cover plate also may include at least one thinned receiving area sized to receive the at least one socket of the receptacle such that the at least one receiving area receives and mates to the at least one socket when the cover plate is affixed to the electrical outlet.

Additional advantages and modifications will readily occur to those skilled in the art. Therefore, the invention in its broader aspects is not limited to the specific details, representative devices, and illustrative examples shown and described. Accordingly, departures may be made from such details without departing from the spirit and scope of the general inventive concept as defined by the appended claims and their equivalents.

What is claimed is:

1. A cover plate for covering an electrical outlet, the electrical outlet including a receptacle having at least one socket and at least one securing aperture for receiving a securing device, each of the at least one socket including a face and a plurality of blade apertures for receiving plug blades, the cover plate comprising:

a front surface for facing outwardly from the electrical outlet and externally relative to the cover plate and a back surface facing toward the electrical outlet;

a plurality of blade apertures extending through the cover plate through the front and back surfaces and positioned in the cover plate so the blade apertures are in substantial alignment with the blade apertures of the at least one socket when the cover plate is affixed to the electrical outlet for receiving the plug blades; and at least one securing aperture extending through the cover plate through the front and back surfaces and positioned in the cover plate so the at least one securing aperture is in substantial alignment with a corresponding one of the at least one securing aperture of the receptacle when the cover plate is affixed to the electrical outlet for receiving the securing device and fixedly positioning the cover plate with respect to the receptacle;

the front surface of the cover plate containing a single line extending substantially in a rectangle around the blade apertures and the at least one securing aperture, the line comprising an indented line indented relative to the remainder of the front surface, the front surface otherwise being continuous, having uniform topography, and being free of any other apertures; and the cover plate being a single component and being solid except for the blade apertures and the at least one securing aperture.

2. The cover plate of claim 1, wherein the electrical outlet is disposed in a hole, and the front surface is sized to cover the entire hole except for the blade apertures of the at least one socket and the at least one securing aperture of the receptacle when the cover plate is affixed to the electrical outlet.

3. The cover plate of claim 1, wherein the line comprises a raised line raised relative to the remainder of the front surface.

4. The cover plate of claim 1, wherein the front surface is substantially planar.

5. The cover plate of claim 1, wherein a substantial portion of the front surface is substantially planar.

6. The cover plate of claim 1, wherein a portion of the back surface is shaped to directly contact and be substantially flush with the face of the at least one socket.

7. The cover plate of claim 1, wherein the back surface includes at least one thinned receiving area sized to receive the at least one socket of the receptacle such that the at least one receiving area receives and mates to the at least one socket when the cover plate is affixed to the electrical outlet.

8. The cover plate of claim 1, wherein the front surface covers the entire face of the at least one socket except for the blade apertures of the at least one socket when the cover plate is affixed to the electrical outlet.

9. The cover plate of claim 1, wherein the receptacle includes a portion including the face of the at least one socket, surface of the cover plate is sized to cover the entire face portion of the receptacle except for the blade apertures of the at least one socket and the at least one securing aperture of the receptacle when the cover plate is affixed to the electrical outlet.

10. The cover plate of claim 1, wherein the front surface other than the line is substantially smooth.

11. A cover plate for covering an electrical outlet, the electrical outlet including a receptacle having at least one socket and at least one securing aperture for receiving a securing device, each of the at least one socket including a face and a plurality of blade apertures for receiving plug blades, the cover plate comprising:

a front surface for facing outwardly from the electrical outlet and externally relative to the cover plate and a back surface facing toward the electrical outlet;

a plurality of blade apertures extending through the cover plate through the front and back surfaces and positioned in the cover plate so the blade apertures are in substantial alignment with the at least two blade apertures of the at least one socket when the cover plate is affixed to the electrical outlet for receiving the plug blades; and at least one securing aperture extending through the cover plate through the front and back surfaces and positioned in the cover plate so the at least one securing aperture is in substantial alignment with a corresponding one of the at least one securing aperture of the receptacle when the cover plate is affixed to the electrical outlet for receiving the securing device and fixedly positioning the cover plate with respect to the receptacle;

the front surface of the cover plate containing a first region substantially rectangular in shape disposed about and including all the blade apertures and the at least one securing aperture and a second region which contains the portion of the front surface other than the first region, the first region being elevated outwardly relative to the second region, the front surface having a discontinuity between the first and second regions, the first region otherwise being continuous, having uniform topography, and being free of any other apertures, and the second region otherwise being continuous, having uniform topography, and being free of any apertures.

12. The cover plate of claim 11, wherein the first region is recessed inwardly relative to the second region.

13. The cover plate of claim 11, wherein each of the first and second regions of the front surface is substantially planar.

14. The cover plate of claim 11, wherein a substantial portion of the second region is substantially planar.

15. The cover plate of claim 11, wherein the back surface includes at least one thinned receiving area sized to receive the at least one socket of the receptacle such that the at least one receiving area receives and mates to the at least one socket when the cover plate is affixed to the electrical outlet.

16. The cover plate of claim 11, wherein a portion of the back surface is shaped to directly contact and be substantially flush with the face of the at least one socket.

17. The cover plate of claim 11, wherein the front surface covers the entire face of the at least one socket except for the blade apertures of the at least one socket when the cover plate is affixed to the electrical outlet.

18. The cover plate of claim 11, wherein the receptacle includes a face portion including the face of the at least one socket, and the front surface of the cover plate is sized to cover the entire face portion of the receptacle except for the blade apertures of the at least one socket and the at least one securing aperture of the receptacle when the cover plate is affixed to the electrical outlet.

19. The cover plate of claim 11, wherein each of the first and second regions of the front surface is substantially smooth.

20. The cover plate of claim 11, wherein a portion of the back surface is shaped to directly contact and be substantially flush with the face of the at least one socket when the cover plate is affixed to the electrical outlet.

21. The cover plate of claim 11, wherein the electrical outlet is disposed in a hole, and the front surface is sized to cover the entire hole except for the blade apertures of the at least one socket and the at least one securing aperture of the receptacle when the cover plate is affixed to the electrical outlet.

22. A cover plate for covering an electrical outlet, the electrical outlet including a receptacle having at least one socket, each of the at least one socket including a face and a plurality of blade apertures for receiving plug blades, the cover plate comprising:

a front surface for facing outwardly from the electrical outlet and externally relative to the cover plate and a back surface for facing toward the electrical outlet;

a plurality of blade apertures extending through the cover plate and through the front and back surfaces and positioned in the cover plate so the blade apertures are in substantial alignment with the blade apertures of the at least one socket when the cover plate is affixed to the electrical outlet for receiving the plug blades;

the front surface of the cover plate containing a first region substantially rectangular in shape disposed about and including all the blade apertures and a second region which contains the portion of the front surface other than the first region, the first region being elevated outwardly relative to the second region, the front surface having a discontinuity between the first and second regions, the first region otherwise being continuous, having uniform topography, and being free of any other apertures, and the second region otherwise being continuous, having uniform topography, and being free of any apertures.

23. The cover plate of claim 22, wherein the first region is recessed inwardly relative to the second region.

24. The cover plate of claim 22, wherein each of the first and second regions of the front surface is substantially planar.

25. The cover plate of claim 22, wherein a substantial portion of the second region is substantially planar.

26. The cover plate of claim 22, wherein the back surface includes at least one thinned receiving area sized to receive the at least one socket of the receptacle such that the at least one receiving area receives and mates to the at least one socket when the cover plate is affixed to the electrical outlet.

27. The cover plate of claim 22, wherein a portion of the back surface is shaped to directly contact and be substantially flush with the face of the at least one socket.

28. The cover plate of claim 22, wherein the front surface covers the entire face of the at least one socket except for the blade apertures of the at least one socket when the cover plate is affixed to the electrical outlet.

29. The cover plate of claim 22, wherein the receptacle includes a face portion including the face of the at least one socket, and the front surface of the cover plate is sized to cover the entire face portion of the receptacle except for the blade apertures of the at least one socket when the cover plate is affixed to the electrical outlet.

30. The cover plate of claim 22, wherein each of the first and second regions of the front surface is substantially smooth.

31. The cover plate of claim 22, wherein the electrical outlet is disposed in a hole, and the front surface is sized to cover the entire hole except for the blade apertures of the at least one socket when the cover plate is affixed to the electrical outlet.

*32. A cover plate for covering an electrical outlet having at least one receptacle with at least one securing aperture for receiving a securing device, and at least one socket having at least two apertures for receiving plug blades, the cover plate comprising:*

*a front surface and a back surface;*

*a plurality of blade apertures and at least one securing aperture, each aperture extending through the front and back surfaces and positioned in the cover plate so the blade apertures are in substantial alignment with the blade apertures of the at least one socket and the securing aperture is in substantial alignment with the securing aperture of the at least one receptacle when the cover plate is affixed to the electrical outlet for receiving the plug blades; and*

*the front surface of the cover plate containing a single line extending substantially in a rectangle around the blade apertures and the at least one securing aperture, the line comprising an indented line indented relative to the remainder of the front surface, the front surface otherwise being continuous, having uniform topography, and being free of any other apertures.*

*33. The cover plate of claim 32, wherein the electrical outlet is disposed in a hole, and the front surface is sized to cover the entire hole except for the blade apertures of the at least one socket and the at least one securing aperture of the receptacle when the cover plate is affixed to the electrical outlet.*

*34. The cover plate of claim 32, wherein the front surface is substantially planar.*

*35. The cover plate of claim 32, wherein a substantial portion of the front surface is substantially planar.*

*36. The cover plate of claim 32, wherein a portion of the back surface is shaped to directly contact and be substantially flush with the face of the at least one socket.*

*37. The cover plate of claim 32, wherein the back surface includes at least one thinned receiving area sized to receive the at least one socket of the receptacle such that the at least one receiving area receives and mates to the at least one socket when the cover plate is affixed to the electrical outlet.*

*38. The cover plate of claim 32, wherein the front surface covers the entire face of the at least one socket except for the blade apertures of the at least one socket when the cover plate is affixed to the electrical outlet.*

*39. The cover plate of claim 32, wherein the receptacle includes a portion including the face of the at least one socket, surface of the cover plate is sized to cover the entire face portion of the receptacle except for the blade apertures of the at least one socket and the at least one securing aperture of the receptacle when the cover plate is affixed to the electrical outlet.*

*40. The cover plate of claim 32, wherein the front surface other than the line is substantially smooth.*

*41. A cover plate for covering an electrical outlet having a receptacle with at least one securing aperture and at least one socket face having at least two apertures for receiving plug blades, the cover plate comprising:*

*a front surface and a back surface;*

*at least two blade apertures and at least one securing aperture extending through the front and back surfaces and positioned in the cover plate so that the apertures are in substantial alignment with the at least two blade apertures and at least one securing aperture of a receptacle when the cover plate is affixed to the electrical outlet;*

*a first region of the front surface substantially rectangular in shape and disposed about and including all the blade apertures and the at least one securing aperture, the first region otherwise being continuous, having uniform topography, and being free of any other apertures;*

*a second region of the front surface different from the first region, the front surface having a discontinuity between the first and second regions, the first region being elevated outwardly relative to the second region, the second region otherwise being continuous, having uniform topography, and being free of any apertures.*

*42. The cover plate of claim 41, wherein each of the first and second regions of the front surface is substantially planar.*

*43. The cover plate of claim 41, wherein a substantial portion of the second region is substantially planar.*

*44. The cover plate of claim 41, wherein the back surface includes at least one thinned receiving area sized to receive the at least one socket of the receptacle such that the at least one receiving area receives and mates to the at least one socket when the cover plate is affixed to the electrical outlet.*

*45. The cover plate of claim 41, wherein a portion of the back surface is shaped to directly contact and be substantially flush with the face of the at least one socket.*

*46. The cover plate of claim 41, wherein the front surface covers the entire face of the at least one socket except for the blade apertures of the at least one socket when the cover plate is affixed to the electrical outlet.*

*47. The cover plate of claim 41, wherein the receptacle includes a face portion including the face of the at least one socket, and the front surface of the cover plate is sized to cover the entire face portion of the receptacle except for the blade apertures of the at least one socket and the at least one securing aperture of the receptacle when the cover plate is affixed to the electrical outlet.*

*48. The cover plate of claim 41, wherein each of the first and second regions of the front surface is substantially smooth.*

*49. The cover plate of claim 41, wherein a portion of the back surface is shaped to directly contact and be substantially flush with the face of the at least one socket when the cover plate is affixed to the electrical outlet.*

*50. The cover plate of claim 41, wherein the electrical outlet is disposed in a hole, and the front surface is sized to cover the entire hole except for the blade apertures of the at least one socket and the at least one securing aperture of the receptacle when the cover plate is affixed to the electrical outlet.*

*51. A cover plate for covering an electrical outlet, the electrical outlet including a receptacle having at least one socket and at least one securing aperture for receiving a securing device, each of the at least one socket including a face and a plurality of blade apertures for receiving plug blades, the cover plate comprising:*

*a front surface for facing outwardly from the electrical outlet and externally relative to the cover plate and a back surface facing toward the electrical outlet;*

*a plurality of blade apertures extending through the cover plate through the front and back surfaces and positioned in the cover plate so the blade apertures are in substantial alignment with the blade apertures of the at least one socket when the cover plate is affixed to the electrical outlet for receiving the plug blades; and*

*at least one securing aperture extending through the cover plate through the front and back surfaces and positioned in the cover plate so the at least one securing aperture is in substantial alignment with a corresponding one of the at least one securing aperture of the receptacle when the cover plate is affixed to the electrical outlet for receiving the securing device and fixedly positioning the cover plate with respect to the receptacle;*

*the front surface of the cover plate containing a single line extending substantially in a rectangle around the blade apertures and the at least one securing aperture, the line comprising an indented line indented relative to the remainder of the front surface, the front surface otherwise being continuous, having uniform topography, having at least two edges that slope toward said back surface, and being free of any other apertures; and*

*the cover plate being a single component and being solid except for the blade apertures and the at least one securing aperture.*

*52. The cover plate of claim 51, wherein the electrical outlet is disposed in a hole, and the front surface is sized to cover the entire hole except for the blade apertures of the at least one socket and the at least one securing aperture of the receptacle when the cover plate is affixed to the electrical outlet.*

*53. The cover plate of claim 51, wherein the line comprises a raised line raised relative to the remainder of the front surface.*

*54. The cover plate of claim 51, wherein the front surface is substantially planar.*

*55. The cover plate of claim 51, wherein a substantial portion of the front surface is substantially planar.*

*56. The cover plate of claim 51, wherein a portion of the back surface is shaped to directly contact and be substantially flush with the face of the at least one socket.*

*57. The cover plate of claim 51, wherein the back surface includes at least one thinned receiving area sized to receive the at least one socket of the receptacle such that the at least one receiving area receives and mates to the at least one socket when the cover plate is affixed to the electrical outlet.*

*58. The cover plate of claim 51, wherein the front surface covers the entire face of the at least one socket except for the blade apertures of the at least one socket when the cover plate is affixed to the electrical outlet.*

*59. The cover plate of claim 51, wherein the receptacle includes a portion including the face of the at least one socket, surface of the cover plate is sized to cover the entire face portion of the receptacle except for the blade apertures of the at least one socket and the at least one securing aperture of the receptacle when the cover plate is affixed to the electrical outlet.*

*60. The cover plate of claim 51, wherein the front surface other than the line is substantially smooth.*

*61. A cover plate for covering an electrical outlet, the electrical outlet including a receptacle having at least one socket and at least one securing aperture for receiving a securing device, each of the at least one socket including a face and a plurality of blade apertures for receiving plug blades, the cover plate comprising:*

*a front surface for facing outwardly from the electrical outlet and externally relative to the cover plate and a back surface facing toward the electrical outlet;*

*a plurality of blade apertures extending through the cover plate through the front and back surfaces and positioned in the cover plate so the blade apertures are in substantial alignment with the at least two blade apertures of the at least one socket when the cover plate is affixed to the electrical outlet for receiving the plug blades; and*

*at least one securing aperture extending through the cover plate through the front and back surfaces and positioned in the cover plate so the at least one securing aperture is in substantial alignment with a corresponding one of the at least one securing aperture of the receptacle when the cover plate is affixed to the electrical outlet for receiving the securing device and fixedly positioning the cover plate with respect to the receptacle;*

*the front surface of the cover plate containing a first region substantially rectangular in shape disposed about and including all the blade apertures and the at least one securing aperture and a second region which contains the portion of the front surface other than the first region, the first region being elevated outwardly relative to the second region, the front surface having a discontinuity between the first and second regions, the first region otherwise being continuous, having uniform topography, and being free of any other apertures, and the second region otherwise being continuous, having uniform topography, having at least two edges that slope toward said back surface, and being free of any apertures.*

*62. The cover plate of claim 61, wherein the first region is recessed inwardly relative to the second region.*

*63. The cover plate of claim 61, wherein each of the first and second regions of the front surface is substantially planar.*

*64. The cover plate of claim 61, wherein a substantial portion of the second region is substantially planar.*

*65. The cover plate of claim 61, wherein the back surface includes at least one thinned receiving area sized to receive the at least one socket of the receptacle such that the at least one receiving area receives and mates to the at least one socket when the cover plate is affixed to the electrical outlet.*

*66. The cover plate of claim 61, wherein a portion of the back surface is shaped to directly contact and be substantially flush with the face of the at least one socket.*

*67. The cover plate of claim 61, wherein the front surface covers the entire face of the at least one socket except for the blade apertures of the at least one socket when the cover plate is affixed to the electrical outlet.*

*68. The cover plate of claim 61, wherein the receptacle includes a face portion including the face of the at least one socket, and the front surface of the cover plate is sized to cover the entire face portion of the receptacle except for the blade apertures of the at least one socket and the at least one securing aperture of the receptacle when the cover plate is affixed to the electrical outlet.*

*69. The cover plate of claim 61, wherein each of the first and second regions of the front surface is substantially smooth.*

*70. The cover plate of claim 61, wherein a portion of the back surface is shaped to directly contact and be substantially flush with the face of the at least one socket when the cover plate is affixed to the electrical outlet.*

*71. The cover plate of claim 61, wherein the electrical outlet is disposed in a hole, and the front surface is sized to cover the entire hole except for the blade apertures of the at least one socket and the at least one securing aperture of the receptacle when the cover plate is affixed to the electrical outlet.*

*72. A cover plate for covering an electrical outlet, the electrical outlet including a receptacle having at least one socket, each of the at least one socket including a face and a plurality of blade apertures for receiving plug blades, the cover plate comprising:*

*a front surface for facing outwardly from the electrical outlet and externally relative to the cover plate and a back surface for facing toward the electrical outlet;*

*a plurality of blade apertures extending through the cover plate and through the front and back surfaces and positioned in the cover plate so the blade apertures are in substantial alignment with the blade apertures of the at least one socket when the cover plate is affixed to the electrical outlet for receiving the plug blades;*

*the front surface of the cover plate containing a first region substantially rectangular in shape disposed about and including all the blade apertures and a second region which contains the portion of the front surface other than the first region, the first region being elevated outwardly relative to the second region, the front surface having a discontinuity between the first and second regions, the first region otherwise being continuous, having uniform topography, and being free of any other apertures, and the second region otherwise being continuous, having uniform topography, having at least two edges that slope toward said back surface, and being free of any apertures.*

*73. The cover plate of claim 72, wherein the first region is recessed inwardly relative to the second region.*

*74. The cover plate of claim 72, wherein each of the first and second regions of the front surface is substantially planar.*

*75. The cover plate of claim 72, wherein a substantial portion of the second region is substantially planar.*

*76. The cover plate of claim 72, wherein the back surface includes at least one thinned receiving area sized to receive*

*the at least one socket of the receptacle such that the at least one receiving area receives and mates to the at least one socket when the cover plate is affixed to the electrical outlet.*

*77. The cover plate of claim 72, wherein a portion of the back surface is shaped to directly contact and be substantially flush with the face of the at least one socket.*

*78. The cover plate of claim 72, wherein the front surface covers the entire face of the at least one socket except for the blade apertures of the at least one socket when the cover plate is affixed to the electrical outlet.*

*79. The cover plate of claim 72, wherein the receptacle includes a face portion including the face of the at least one socket, and the front surface of the cover plate is sized to cover the entire face portion of the receptacle except for the blade apertures of the at least one socket when the cover plate is affixed to the electrical outlet.*

*80. The cover plate of claim 72, wherein each of the first and second regions of the front surface is substantially smooth.*

*81. The cover plate of claim 72, wherein the electrical outlet is disposed in a hole, and the front surface is sized to cover the entire hole except for the blade apertures of the at least one socket when the cover plate is affixed to the electrical outlet.*

* * * * *